(12) United States Patent
Caille et al.

(10) Patent No.: US 9,651,738 B2
(45) Date of Patent: May 16, 2017

(54) DISTRIBUTED FEEDING CIRCUIT FOR ANTENNA BEAMFORMING ARRAY

(71) Applicants: THALES, Neuilly sur Seine (FR); DAS PHOTONICS S.L., Valencia (ES)

(72) Inventors: Gerard Caille, Tournefeuille (FR); Michel Sotom, Toulouse (FR); Miguel Angel Piqueras Ruiperez, Valencia (ES); Teresa Mengual Chulia, Valencia (ES)

(73) Assignees: THALES, Courbevoie (FR); DAS PHOTONICS S.L, Valenica (ES)

( * ) Notice: Subject to any disclaimer, the term of this patent is extended or adjusted under 35 U.S.C. 154(b) by 406 days.

(21) Appl. No.: 14/262,143

(22) Filed: Apr. 25, 2014

(65) Prior Publication Data

US 2014/0320346 A1    Oct. 30, 2014

(30) Foreign Application Priority Data

Apr. 26, 2013    (FR) .................... 13 00972

(51) Int. Cl.
  *H01Q 3/26*    (2006.01)
  *G02B 6/28*    (2006.01)
  (Continued)

(52) U.S. Cl.
  CPC ........... *G02B 6/28* (2013.01); *G02B 6/29386* (2013.01); *H01Q 3/2676* (2013.01)

(58) Field of Classification Search
  CPC ... G02B 6/24; G02B 6/26; G02B 6/28; G02B 6/293; G02B 6/29379; G02B 6/2938; G02B 6/29386; H01Q 3/26; H01Q 3/2676
  See application file for complete search history.

(56) References Cited

U.S. PATENT DOCUMENTS

| | | | | |
|---|---|---|---|---|
| 4,736,463 | A | * | 4/1988 | Chavez ............... H01Q 3/2676 342/367 |
| 4,739,334 | A | * | 4/1988 | Soref .................. H01Q 3/2676 342/200 |

(Continued)

FOREIGN PATENT DOCUMENTS

| | | |
|---|---|---|
| CA | 2100839 A1 | 1/1995 |
| FR | 2929764 A1 | 10/2009 |

(Continued)

OTHER PUBLICATIONS

Jesse Butler, et al., "Beam-Forming Matrix Simplifies Design of Electronically Scanned Antennas", Electronic Design, Apr. 12, 1961, pp. 170-173, vol. 9.

(Continued)

*Primary Examiner* — Bernarr Gregory
(74) *Attorney, Agent, or Firm* — Baker & Hostetler LLP

(57) ABSTRACT

A distributed feeding circuit for antenna beamforming array comprises a plurality N of inputs and a plurality N of outputs, wherein the said circuit is adapted for receiving, on at least one input, an electrical signal at a microwave frequency, modulated on at least one optical carrier, the circuit comprising at least one assembly of at least two optical dividers, two delay lines of length zero or substantially equal to a fraction of the wavelength of the signal at its microwave frequency and two means for combining two optical signals, the assembly being arranged and the delay lines being configured so that the theoretical transfer function of the circuit is an orthogonal matrix.

21 Claims, 9 Drawing Sheets

(51) Int. Cl.
  *G02B 6/293* (2006.01)
  *H01Q 3/00* (2006.01)
  *G02B 6/00* (2006.01)

(56) References Cited

U.S. PATENT DOCUMENTS

| | | | | |
|---|---|---|---|---|
| 4,814,773 A | * | 3/1989 | Wechsberg | H01Q 3/2676 342/368 |
| 4,929,956 A | * | 5/1990 | Lee | H01Q 3/2676 342/376 |
| 5,117,239 A | * | 5/1992 | Riza | H01Q 3/2676 342/158 |
| 5,231,405 A | * | 7/1993 | Riza | H01Q 3/2676 342/158 |
| 5,247,310 A | * | 9/1993 | Waters | H01Q 3/2676 342/368 |
| 5,367,305 A | * | 11/1994 | Volker | H01Q 3/2676 342/368 |
| 5,374,935 A | * | 12/1994 | Forrest | H01Q 3/2676 342/368 |
| 5,663,736 A | * | 9/1997 | Webb | H01Q 3/2676 250/227.12 |
| 6,020,850 A | * | 2/2000 | Ji | H01Q 3/2676 342/368 |
| 6,337,660 B1 | | 1/2002 | Esman et al. | |
| 6,417,804 B1 | * | 7/2002 | Merlet | H01Q 3/2676 342/154 |
| 6,426,721 B1 | | 7/2002 | Obara | |
| 6,563,966 B1 | * | 5/2003 | Tang | H01Q 3/2676 385/10 |
| 6,807,343 B2 | * | 10/2004 | Tulchinsky | H01Q 3/2676 385/140 |

FOREIGN PATENT DOCUMENTS

| | | |
|---|---|---|
| WO | 03079101 A1 | 9/2003 |
| WO | 2009121967 A1 | 10/2009 |

OTHER PUBLICATIONS

John T. Gallo, et al., "Experimental Demonstration of Optical Guided-Wave Butler Matrices", IEEE Transactions on Microwave Theory and Techniques, Aug. 1, 1997, pp. 1501-1507, vol. 45, No. 8, IEEE Service Center, Piscataway, NJ, USA, XP011036900.

G.K. Gopalakrishnan, et al., "A LiNbO3 Microwave-Optoelectronic Mixer with Linear Performance", IEEE MTT-S Dig, 1993, pp. 1055-1058.

* cited by examiner $$\mathbf{F} = \frac{1}{2D\sqrt{2}} \begin{bmatrix}
1 & e^{-j\pi/8} & e^{-j3\pi/8} & e^{-j\pi/2} & e^{-j5\pi/8} & e^{-j3\pi/4} & e^{-j7\pi/8} & e^{-j4\pi/8} \\
e^{-j7\pi/8} & 1 & e^{-j9\pi/8} & e^{-j11\pi/8} & e^{-j\pi/2} & e^{-j13\pi/8} & e^{-j3\pi/4} & e^{-j3\pi/4} \\
e^{-j3\pi/4} & e^{-j11\pi/8} & -1 & e^{-j5\pi/8} & e^{-j15\pi/8} & e^{-j\pi/2} & e^{-j9\pi/8} & e^{-j5\pi/8} \\
e^{-j9\pi/8} & e^{-j3\pi/4} & e^{-j3\pi/8} & -1 & e^{-j13\pi/8} & e^{-j15\pi/8} & e^{-j7\pi/8} & e^{-j\pi/2} \\
e^{-j\pi/2} & e^{-j7\pi/8} & e^{-j5\pi/4} & e^{-j13\pi/8} & -1 & e^{-j3\pi/8} & e^{-j3\pi/4} & e^{-j9\pi/8} \\
e^{-j9\pi/8} & e^{-j\pi/2} & e^{-j15\pi/4} & e^{-j5\pi/4} & e^{-j15\pi/8} & -1 & e^{-j11\pi/8} & e^{-j3\pi/4} \\
e^{-j3\pi/4} & e^{-j13\pi/8} & e^{-j\pi/2} & e^{-j11\pi/8} & e^{-j9\pi/8} & e^{-j3\pi/4} & -1 & e^{-j7\pi/8} \\
e^{-j4\pi/8} & e^{-j13\pi/4} & e^{-j5\pi/4} & e^{-j3\pi/8} & e^{-j3\pi/4} & e^{-j7\pi/8} & e^{-j\pi/2} & 1
\end{bmatrix}$$

FIG. 4B $$T'4 = 1/2p \begin{bmatrix} j & j & -1 & -1 & 1 & 1 & 1 & 1 \\ -j & j & -1 & 1 & 1 & -1 & 1 & 1 \\ -j & -j & 1 & 1 & 1 & 1 & 1 & 1 \end{bmatrix}$$

$$T'8 = \frac{1}{2p\sqrt{2}} \begin{bmatrix} 1 & 1 & 1 & 1 & 1 & 1 & 1 & 1 \\ e^{-j7\pi/4} & e^{-j3\pi/4} & e^{-j5\pi/4} & e^{-j\pi/4} & 1 & e^{-j6\pi/4} & 1 & e^{-j\pi} \\ e^{-j6\pi/4} & e^{-j6\pi/4} & e^{-j2\pi/4} & e^{-j2\pi/4} & e^{-j2\pi/4} & e^{-j2\pi/4} & 1 & 1 \\ e^{-j5\pi/4} & e^{-j9\pi/4} & e^{-j7\pi/4} & e^{-j3\pi/4} & e^{-j5\pi/4} & e^{-j\pi} & e^{-j6\pi/4} & e^{-j\pi} \\ e^{-j\pi} & e^{-j\pi} & e^{-j\pi} & e^{-j\pi} & 1 & e^{-j\pi} & 1 & 1 \\ e^{-j3\pi/4} & e^{-j7\pi/4} & e^{-j9\pi/4} & e^{-j5\pi/4} & e^{-j6\pi/4} & e^{j\pi} & e^{-j6\pi/4} & e^{-j\pi} \\ e^{-j2\pi/4} & e^{-j10\pi/4} & e^{-j6\pi/4} & e^{-j6\pi/4} & e^{-j10\pi/4} & e^{-j10\pi/4} & 1 & 1 \\ e^{-j\pi/4} & e^{-j13\pi/4} & e^{-j3\pi/4} & e^{-j7\pi/4} & e^{-j6\pi/4} & e^{-j5\pi/4} & e^{-j6\pi/4} & e^{-j\pi} \end{bmatrix}$$

FIG. 5C

DISTRIBUTED FEEDING CIRCUIT FOR ANTENNA BEAMFORMING ARRAY

CROSS-REFERENCE TO RELATED APPLICATION

This application claims priority to foreign French patent application No. FR 1300972, filed on Apr. 26, 2013, the disclosure of which is incorporated by reference in its entirety.

FIELD OF THE INVENTION

The invention relates to the field of antenna beamforming arrays for antennal arrays. It relates more precisely to a distributed feeding circuit for a beamforming array.

The field of the invention is that of antenna arrays, notably for satellite antennas. Satellite antenna arrays have the capacity to generate several antenna beams in various directions of observation. Such multi-beam antennas are used aboard a satellite for telecommunications applications in various frequency bands, for example the Ka band for multimedia applications, the Ku or C bands for point-to-point communication links or else the L or S bands for satellite-based mobile communications. Antenna arrays have the advantage of allowing a reconfiguration of the various beams, notably of their number and of their direction of pointing.

Accordingly, a multi-beam antenna needs to be coupled to a beamforming array tasked with routing the appropriate feeding signal to the various antennal elements of the antenna array with a view to configuring the antenna beams generated by each of the said elements.

The field of the invention is therefore also that of antenna beamforming arrays. A sub-field relates to matrix-like beamforming arrays known by the name of Butler matrices. A Butler matrix is a microwave-frequency passive device composed of hybrid couplers and phase shifters. Such a device is known from the field of antennal arrays and is notably described in the publication "*Beam-Forming Matrix Simplifies Design of Electronically Scanned Antennas,* "by Jesse Butler and Ralph Lowe Electronic Design, volume 9, pp. 170-173, Apr. 12, 1961. It makes it possible to obtain, for a microwave-frequency signal produced on one of its inputs, an equi-amplitude distribution of this signal over all the outputs, with a regular phase increment between each consecutive output.

When the output ports of a Butler matrix are connected to the radiating elements of an antennal array, the microwave-frequency signal injected on each input of the matrix is radiated by the antenna array in a predetermined direction and according to a predetermined directional antenna beam. All the antenna beams thus generated via the various radiating elements are regularly spaced and orthogonal. The orthogonality property of the beams is significant for obtaining good mutual isolation of the various pathways.

An advantage of the Butler matrix is that it requires a minimum number of couplers, of the order of $N \cdot (\log_2 N)/2$ instead of $2N(N-1)$, for a conventional beamforming array, with N the number of outputs of the matrix equal to the number of antenna beams to be generated.

BACKGROUND

Butler matrices are generally employed for microwave-frequency signals or more generally for electrical signals in the microwave frequency range. The technology conventionally used to produce a Butler matrix is waveguide technology which exhibits the drawback of significant bulkiness. Indeed, for onboard applications, a problem to be solved relates to the miniaturization of such devices since the compactness of an antennal device is a significant advantage especially when the number of antenna elements, and therefore indirectly the number of outputs of the Butler matrix, increases.

A known solution making it possible to solve the problem of bulkiness of the Butler matrices produced with waveguide technology consists in converting the electrical signal at a microwave frequency into an optical signal so as to be able to produce the Butler matrix consisting of an arrangement of couplers and delay lines implemented by a photonic integrated circuit or PIC. The wavelength of an optical signal being by nature substantially more reduced than that of an electrical signal at a microwave frequency, the compactness of the device is thus improved.

Solutions for implementing Butler matrices utilizing the technology of photonic integrated circuits are described notably in the scientific publication "Experimental Demonstration of Optical Guided-Wave Butler Matrices, "by J.T. Gallo and R. DeSalvo, IEEE Transactions on Microwave Theory and Techniques, Vol. 45, No. 8, August 1997" or in the international publication of application WO 2003/079101.

The proposed architectures are based on heterodyne optical systems which require very precise control of the optical phase and implementation of complex phase control loops.

A problem with this type of architecture relates to the precision of the phase shifters required to produce a Butler matrix. Indeed, as indicated hereinabove a Butler matrix is traditionally composed of hybrid couplers but also of phase shifters. The arrangement of these couplers and phase shifters makes it possible to produce the desired matrix transfer function, which must be unitary or at least orthogonal, so as notably to configure the phases of the output signals of the matrix. For a matrix with 8 inputs and 8 outputs, the necessary phase shifts are multiples of PI/8 or 22.5°. A phase shifter is in practice embodied by a delay line. Now, in the optical domain, the wavelength (directly related to the phase shift to be imparted) is much reduced, typically of the order of a few nanometres. It is therefore seen that a problem exists relating to the precision of the embodiment of the delay lines to implement the desired phase shifts with the required accuracy. The precision of the phase shifts is significant since it is directly related to the mutual isolation of the output pathways of the matrix. If the phase shifts are not implemented in a sufficiently precise manner, this has an impact on the transfer function of the matrix which is then no longer unitary.

A problem therefore exists in respect of improving the precision of the phase shifters of a Butler matrix implemented in PIC technology.

The present invention affords a response to the aforementioned problem by proposing a distributed feeding circuit having small bulk, since it can be embodied in PIC technology, adapted for receiving an electrical signal modulated on optical carrier.

The invention exhibits the main advantage of allowing configuration of the lengths of the delay lines on the scale of the microwave frequencies of the electrical signal, thereby greatly facilitating the implementation of the precise phase shifts such a circuit must comprise.

The distributed feeding circuit according to the invention, allows, when it is employed in an antenna beamforming array, the generation of a multiple antenna beam in directions of pointing whose angular spacing is adjustable.

SUMMARY OF THE INVENTION

The subject of the invention is a distributed feeding circuit for antenna beamforming array comprising a plurality N of inputs and a plurality N of outputs, the said circuit being adapted for receiving, on at least one input, an electrical signal at a microwave frequency, modulated on at least one optical carrier, the said circuit comprising at least one assembly of at least two optical dividers, at least one delay line of length substantially equal to an integer fraction of the wavelength of the said signal at its microwave frequency and two means for combining two optical signals, the said assembly being arranged and the delay lines being configured so that the theoretical transfer function of the said circuit is an orthogonal matrix.

According to a particular aspect of the distributed feeding circuit according to the invention, a delay line is connected, at a first end, to a first output of an optical divider.

According to a particular aspect of the distributed feeding circuit according to the invention, an optical divider is connected, by its input, to an input of the said circuit.

According to a particular aspect of the distributed feeding circuit according to the invention, a means for combining two optical signals is connected, by its output, to an output of the said circuit.

According to a particular aspect of the distributed feeding circuit according to the invention, the said assembly comprises two delay lines which are of length substantially equal to a quarter of the wavelength of the said signal at its microwave frequency.

According to a particular aspect of the distributed feeding circuit according to the invention, the said assembly comprises a delay line of length substantially equal to half the wavelength of the said signal at its microwave frequency.

According to a particular aspect of the distributed feeding circuit according to the invention, the number N of inputs and of outputs is a power of two.

According to a particular aspect of the distributed feeding circuit according to the invention, a second output of an optical divider is connected to a first input of a means for combining two optical signals and a delay line is connected, at a second end, to a second input of a means for combining two optical signals.

According to a particular aspect of the distributed feeding circuit according to the invention, the said circuit comprises a number of assemblies that is equal to the binary logarithm of the number N of inputs and of outputs that is multiplied by half of the said number N.

According to a particular aspect of the distributed feeding circuit according to the invention, an output of a means for combining two optical signals of a first assembly is connected to an input of an optical divider of a second assembly, directly or by way of an additional delay line of length zero or substantially equal to half the length of a delay line, of non-zero length, of one of the said assemblies, the said length being configured so that the theoretical transfer function of the said circuit is an orthogonal matrix.

According to a particular aspect of the distributed feeding circuit according to the invention, the assembly formed by a means for combining two optical signals and an optical divider, connected in series, is replaced with an optical coupler, the said additional delay line being connected, at a first end, to an output of an optical coupler.

According to a particular aspect of the distributed feeding circuit according to the invention, a means for combining two optical signals is a 3-dB optical combiner.

According to a particular aspect of the distributed feeding circuit according to the invention, a means for combining two optical signals is a multiplexer of at least two optical wavelengths and the theoretical transfer function of the said circuit is a unit matrix.

According to a particular aspect of the distributed feeding circuit according to the invention, an optical coupler is replaced with a first interleaver of optical wavelengths and a means, linked to an output of the said circuit, for combining two optical signals is a second interleaver of optical wavelengths, an interleaver of optical wavelengths being able to receive on an input a plurality of optical wavelengths and to deliver them alternatively on one or the other of its outputs according to a given interleaving period, the interleaving period of a second interleaver being equal to double the interleaving period of a first interleaver.

According to a particular aspect of the distributed feeding circuit according to the invention, the said circuit is an optical integrated circuit or a circuit embodied by means of optical fibres.

The subject of the invention is also an antenna beamforming array comprising means for modulating at least one electrical signal at a microwave frequency on an optical carrier, a distributed feeding circuit according to the invention for receiving the said at least one electrical signal on optical carrier and means for converting the said electrical signal on optical carrier into an electrical signal intended to feed at least one antennal element of an antenna array.

According to a particular aspect of the antenna beamforming array according to the invention, the said means for modulating an electrical signal on optical carrier are adapted for modulating the electrical signals intended to be injected onto the inputs of the said distributed feeding circuit on optical carriers of different wavelengths.

The subject of the invention is also the use of a distributed feeding circuit according to the invention, or of an antenna beamforming array according to the invention consisting in injecting, onto the inputs of the said distributed feeding circuit, a plurality of electrical signals on optical carrier according to an increasing arrangement of the values of the optical wavelengths of the said signals or according to an arrangement alternating the even and odd values of the optical wavelengths of the said signals.

The subject of the invention is also a receiver comprising a plurality of antennal elements delivering an electrical signal, means for modulating the said electrical signal at a microwave frequency on an optical carrier, a distributed feeding circuit according to the invention for receiving the said electrical signal on optical carrier and means for converting the said electrical signal on optical carrier into an electrical signal.

The subject of the invention is also a multi-port amplification device comprising means for modulating at least one electrical signal at a microwave frequency on an optical carrier, a first distributed feeding circuit according to the invention for receiving the said electrical signal on optical carrier, means for converting the said electrical signal on optical carrier into an electrical signal and a second distributed feeding circuit designed to receive the electrical output signal of the conversion means.

BRIEF DESCRIPTION OF THE DRAWINGS

Other characteristics and advantages of the present invention will become more apparent on reading the description which follows in relation to the appended drawings which represent.

DETAILED DESCRIPTION

Figure 1:
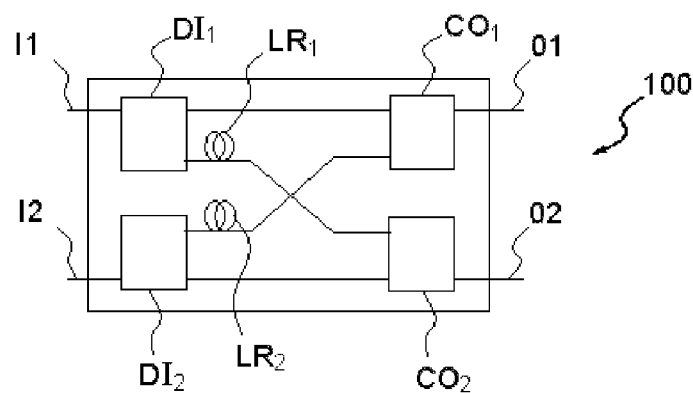
FIG. 1, a diagram of a 90° coupler with two inputs and two outputs according to the invention, FIG. 2, a diagram of a distributed feeding circuit with four inputs and four outputs according to the invention, FIG. 3, a diagram of a variant embodiment of the 4×4 feeding circuit of FIG. 2, FIG. 4A, a diagram of a distributed feeding circuit with eight inputs and eight outputs according to the invention, FIG. 4B, the orthogonal matrix corresponding to the theoretical transfer function of the circuit of FIG. 4A, FIG. 5A, a diagram of a variant embodiment of the 8×8 feeding circuit of FIG. 4, FIG. 5B, a diagram illustrating the operation of a wavelengths interleaving multiplexer employed in the circuit of FIG. 5A, FIG. 5C, two other examples of matrix transfer functions for the embodiment of another variant of the feeding circuit according to the invention, respectively for 4 inputs/outputs and 8 inputs/outputs, on the basis of a 180° coupler, FIG. 6, a diagram of a beamforming array according to the invention, FIG. 7, a diagram illustrating the formations of antenna beams obtained with a beamforming array according to one or the other of the variant embodiments of the coupler with two inputs and two outputs according to the invention, FIG. 8, a diagram of an additional variant embodiment of a feeding circuit according to the invention with four inputs and four outputs, FIG. 9, a diagram of an antennal device operating in reception, the said device comprising a distributed feeding circuit according to the invention, FIG. 10, a variant of the beamforming array according to the invention and described in FIG. 6, FIG. 11, a diagram of a multi-port amplification device comprising two distributed feeding circuits according to the invention.

FIG. 1 represents, in a diagram, an example of a first embodiment of a distributed feeding circuit according to the invention. The example relates to a circuit with two inputs and two outputs, but can be extended, as is explained subsequently, to a circuit with N inputs and N outputs, with N an integer equal to a power of two. When the number N of inputs and of outputs is equal to two as in the example of FIG. 1, the distributed feeding circuit is equivalent to a coupler, for example a hybrid coupler.

The feeding circuit 100 of FIG. 1 is composed of an assembly of two optical dividers DI1,DI2, two optical combiners CO1,CO2, and two delay lines LR1,LR2. An input of an optical divider DI1,DI2 is connected to an input I1,I2, of the feeding circuit 100. An output of an optical combiner CO1,CO2, is connected to an output O1,O2, of the feeding circuit 100. A delay line LR1,LR2 is connected, at a first end, to an output of an optical divider DI1,DI2 and at a second end, to an input of an optical combiner CO1,CO2. The second output of an optical divider DI1 is connected to the second input of the optical combiner CO1 whose first input is linked to the other optical divider DI2 via the delay line LR2.

The two delay lines LR1,LR2 have a length equal to a quarter of the wavelength of the signal at the microwave frequency. As the signal injected on the inputs I1,I2, of the circuit 100 according to the invention is an electrical signal on optical carrier, the length of the delay lines LR1,LR2 is configured to obtain a phase shift of PI/2 or 90° in the frequency domain of the electrical signal, that is to say in the microwave frequency domain. In this manner, it is easier to obtain the required precision in the phase shift since the wavelength in the microwave frequency domain is of the order of some ten millimetres whereas it is only of the order of a micrometre in the optical frequency domain.

The optical dividers DI1,DI2 and the optical combiners CO1,CO2, are optical coupling devices which are able to divide a signal in power or to combine two signals to obtain a signal of double the power. The output signals of an optical divider DI1,DI2 are in phase.

The arrangement of the dividers, combiners and delay lines is effected such that the theoretical transfer function of the feeding circuit 100 according to the invention is equal to $$T = \frac{1}{p\sqrt{2}} \begin{pmatrix} 1 & -j \\ -j & 1 \end{pmatrix},$$

where j is the imaginary unit, that is to say the complex number whose square is equal to −1 and p is an amplitude loss factor, $p^2$ being the corresponding power loss factor.

The amplitude loss factor p is equal to one in the case where the optical combiners CO1, CO2, are embodied by devices which do not induce any loss in amplitude on the output signal. This is the case notably for multiplexers of different frequency sub-bands, as will be explained subsequently.

The loss factor p is less than 1 if the optical combiners CO1, CO2, are embodied by devices which induce losses in amplitude on the output signal. This is the case notably for optical summation devices or optical summators. Indeed a summator, or summation device, can only be loss-free for a precise phase relation between the input signals, for example a zero phase difference for a summator termed 'in-phase'. As the signals originating from each input are different, in practice decorrelated, this phase condition may not be complied with, and it is well known to a person skilled in the art that a summator induces a loss in amplitude of 3 dB between any one of the inputs and its output. The value of the loss factor is in this case equal to $1/\sqrt{2}$ and stems from the fact that $20 \log(1/\sqrt{2}) = -3$ dB.

Whatever the value of the loss factor p, the theoretical transfer function of the feeding circuit 100 according to the invention is an orthogonal matrix, that is to say it satisfies the relation VO1. VO2*·VO2. VO1*=0, where VO1 and VO2, are the column vectors (in the example of FIG. 1, these vectors comprise only two terms) composed of the values of the complex amplitudes of the two output signals of the feeding circuit 100. The operator * is the conjugate transpose operator. V* is a row matrix composed of the complex conjugates of the values of the vector V.

In the case where the loss factor p is equal to 1, stated otherwise when the feeding circuit according to the invention is loss-free, then its theoretical transfer function is furthermore a unit matrix, that is to say it satisfies the following relation T·T*=T*·T=Id, with Id the identity matrix and T* the conjugate transpose matrix also called the Hermitian conjugate of the matrix T. In the case where the loss factor is different from 1, the above relation becomes T·T*=T*·T=(1/$p^2$)·Id, the matrix T is then solely orthogonal.

The fact that the transfer function of the feeding circuit 100 is an orthogonal matrix is an essential property since it makes it possible to obtain perfect isolation of the output pathways of the circuit with respect to one another and a regular spacing of the beams generated by the antenna fed by this device. If the matrix is not a unit matrix, the losses are manifested by the fact that a significant share of the power of the input signal is reflected.

The output signals of the feeding circuit 100 are thus given, in complex notation, by the following relations, as a function of the input signals:

$$O1=1/(p\sqrt{2})(I1-j\cdot I2)$$

$$O2=1/(p\sqrt{2})(-j\cdot I1+I2)$$

Stated otherwise, when a signal is produced on the first input I1, the signal resulting on the first output O1 is in phase with the input signal and the signal resulting on the second output O2, is phase-shifted by −PI/2. When a signal is produced on the second input I2, the signal resulting on the second output O2, is in phase with the input signal and the signal resulting on the first output O1 is phase-shifted by −PI/2.

The feeding circuit 100 according to the invention thus makes it possible to obtain the required phase shift of plus or minus PI/2 between the two outputs of the circuit. It is not possible to obtain such a phase shift, calculated at the microwave frequency, with a simple optical coupler since the latter makes it possible to impart only phase shifts effected on the scale of optical frequencies, which are much higher than microwave frequencies.

The feeding circuit 100 according to the invention is advantageously embodied by an optical integrated circuit or PIC (photonic integrated circuit) circuit and is generally implemented by way of an integrated optics technology. An advantage of this technology is the miniaturization of the device produced.

Alternatively, in particular if the microwave frequencies are low, the feeding circuit 100 according to the invention can also be embodied as optical fibres.

The circuit 100 described in FIG. 1 can be generalized to a distributed feeding circuit comprising N inputs and N outputs, with N an integer equal to a power of two.

Figure 2:
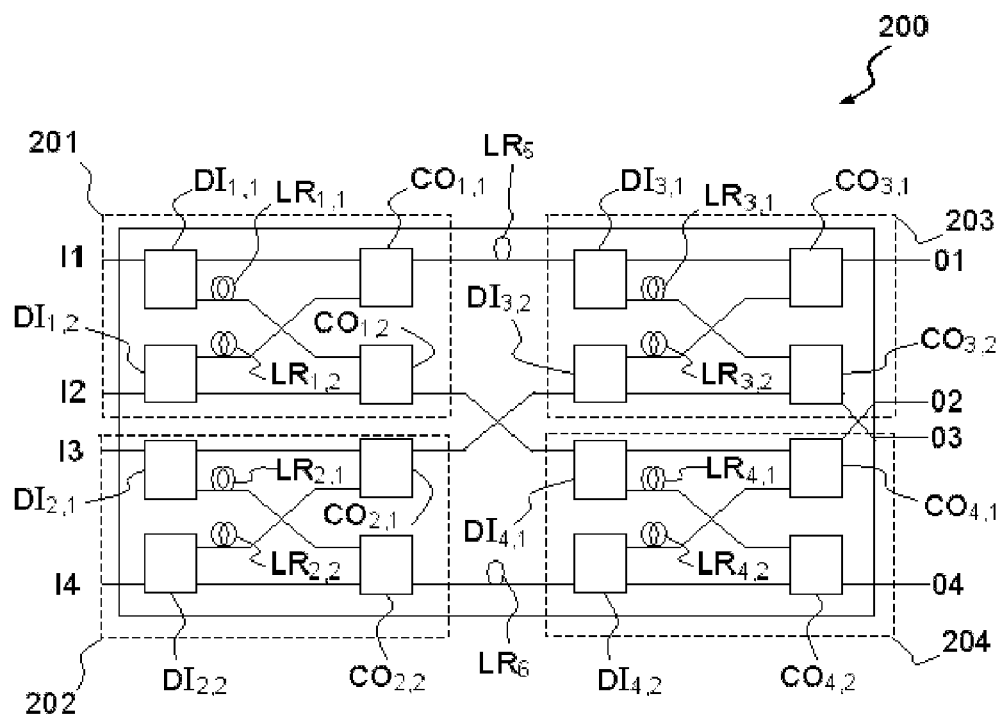

FIG. 2 describes a feeding circuit 200 with four inputs I1,I2,I3,I4, and four outputs O1,O2,O3,O4.

The circuit 200 of FIG. 2 comprises four assemblies 201,202,203,204 of two dividers, two combiners and two delay lines arranged in the same manner as for the circuit 100 of FIG. 1 with two inputs and two outputs.

The four assemblies 201,202,203,204 are connected together in the following manner. The output of a combiner $CO_{1,1}$ of the first assembly 201 is connected to the input of a divider $DI_{3,1}$ of the third assembly 203 by way of a delay line LR5 of length equal to an eighth of the wavelength of the signal at the microwave frequency. The output of a combiner $CO_{2,2}$ of the second assembly 202 is connected to the input of a divider $DI_{4,2}$ of the fourth assembly 204 by way of a delay line LR6 of length equal to an eighth of the wavelength of the signal at the microwave frequency. The output of a combiner $CO_{1,2}$ of the first assembly 201 is connected directly to the input of a divider $DI_{4,1}$ of the fourth assembly. The output of a combiner $CO_{2,1}$ of the second assembly 202 is connected directly to the input of a divider $DI_{3,2}$ of the third assembly.

The four assemblies 201,202,203,204 are arranged so that the transfer function of the feeding circuit 200 according to the invention is equal to the orthogonal matrix $$T = \frac{1}{2p}\begin{pmatrix} 1 & e^{-\frac{j3\pi}{4}} & e^{-\frac{j\pi}{2}} & e^{-\frac{j3\pi}{4}} \\ e^{-\frac{j\pi}{4}} & 1 & e^{-\frac{j5\pi}{4}} & e^{-\frac{j\pi}{2}} \\ e^{-\frac{j\pi}{2}} & e^{-\frac{j5\pi}{4}} & 1 & e^{-\frac{j\pi}{4}} \\ e^{-\frac{j3\pi}{4}} & e^{-\frac{j\pi}{2}} & e^{-\frac{j3\pi}{4}} & 1 \end{pmatrix},$$

where p is the amplitude loss factor introduced previously.

As a function of the activated input I1,I2,I3,I4, that is to say of the input on which a signal is injected, the signals obtained on the four outputs O1,O2,O3,O4 have equal power and are regularly mutually phase shifted by a constant phase shift which is a multiple of PI/4.

The circuit represented in FIG. 2 can be generalized to any distributed feeding circuit with N inputs and N outputs, N being a power of 2, by increasing the number of assemblies 201,202,203,204 to a number equal to (N/2)log 2(N) and by mutually interconnecting them by means of delay lines of length equal to a multiple of the wavelength of the signal at a microwave frequency divided per 2N.

Figure 3:
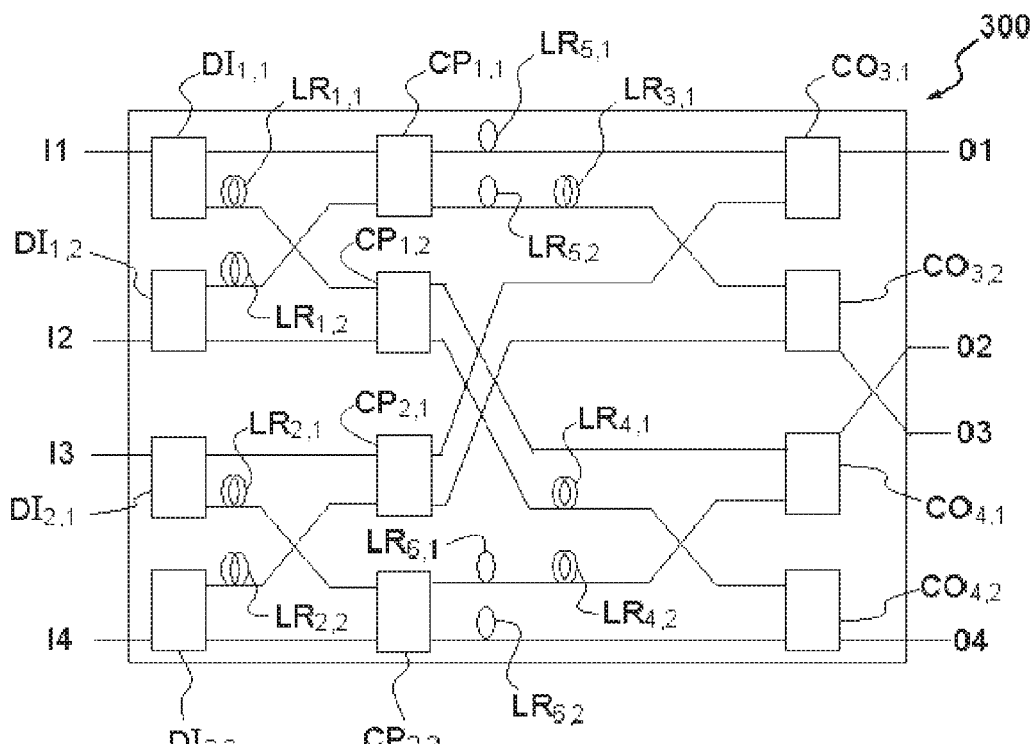

FIG. 3 represents a diagram of a variant embodiment of the feeding circuit 200 of FIG. 2.

In order to further improve the compactness of the circuit according to the invention by decreasing the number of hardware components required, the assembly formed by a combiner and a divider mounted in series is replaced by a coupler with two inputs and two outputs.

For example, the assembly formed of the combiner $CO_{1,2}$ and divider $DI_{4,1}$ connected in series is replaced with a single coupler $CP_{1,2}$. Likewise the assembly formed of the combiner $CO_{2,1}$ and divider $DI_{3,2}$ connected in series is replaced with a single coupler $CP_{2,1}$. The assembly formed of the combiner $CO_{1,1}$ and divider $DI_{3,1}$ connected in series by way of a delay line $LR_5$ is replaced with a single coupler $CP_{1,1}$ whose two outputs are connected to two delay lines $LR_{5,1}$ and $LR_{5,2}$ of the same length equal to an eighth of the wavelength of the signal at the microwave frequency. The assembly formed of the combiner $CO_{2,2}$ and divider $DI_{4,2}$ connected in series by way of a delay line $LR_6$ is replaced with a single coupler $CP_{2,2}$ whose two outputs are connected to two delay lines $LR_{6,1}$ and $LR_{6,2}$ of the same length equal to an eighth of the wavelength of the signal at the microwave frequency.

The couplers $CP_{1,1}$, $CP_{1,2}$, $CP_{2,1}$, $CP_{2,2}$ used are optical couplers which do not introduce any appreciable phase shift, on the scale of the microwave frequency domain, between the two signals delivered by their two respective outputs.

Two delay lines $LR_{5,2}$, $LR_{3,2}$ mounted in series can be replaced with a single delay line of length equal to the sum of the lengths of the two lines.

Another advantage of this variant embodiment is that dispensing with the combiners $CO_{1,1}$ $CO_{1,2}$ $CO_{2,1}$ $CO_{2,2}$ makes it possible to avoid losses in power when the input signals of the combiners are not phase-coherent.

Figure 4A:
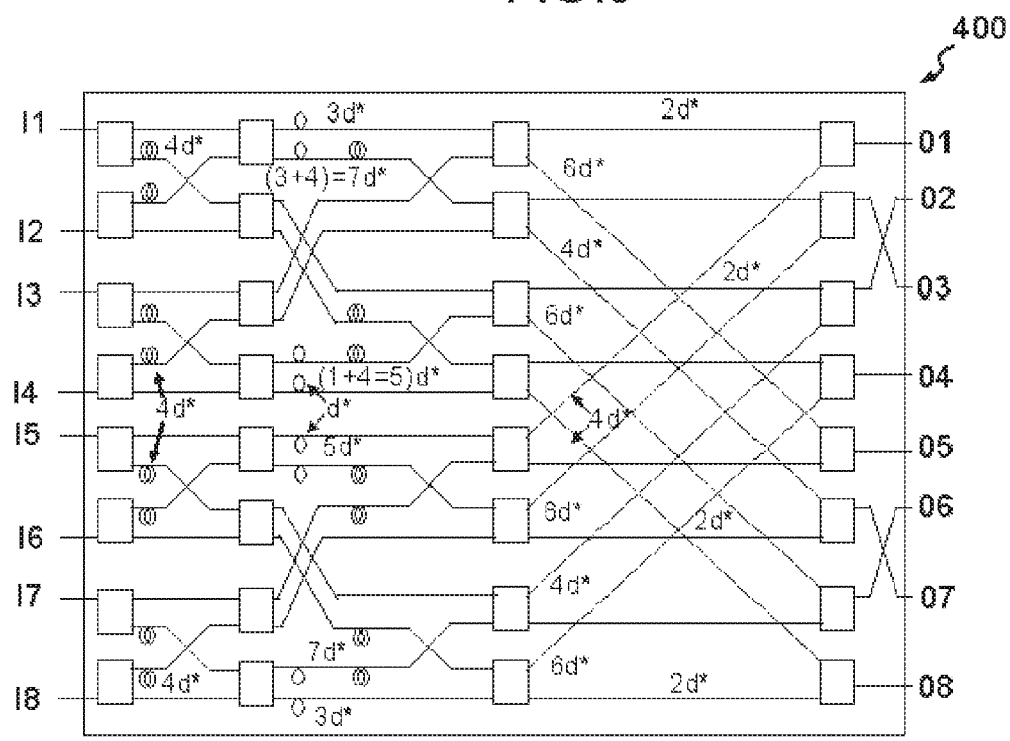

FIG. 4A represents a diagram of a feeding circuit 400 with eight inputs and eight outputs according to the invention.

The circuit 400 described in FIG. 4A is derived from the circuit 300 described in FIG. 3 by doubling the number of inputs and outputs.

The circuit 400 comprises eight optical dividers, each connected to an input I1, . . . , I8 of the circuit 400 and eight optical combiners, each linked to an output O1, . . . , O8 of the circuit 400. The circuit 400 furthermore comprises two stages of eight dual-input and dual-output optical couplers. The various hardware components of the circuit 400 are connected together, either directly, or by way of delay lines of length equal to a multiple of the distance d'=$\lambda_{RF}$/16 where $\lambda_{RF}$ is the wavelength of the signal at the microwave frequency. In FIG. 4 are indicated the precise values of the lengths of the various delay lines as a multiple of the length d'.

The assembly of hardware components of the circuit 400 is arranged so that the theoretical transfer function T of the circuit is the orthogonal matrix represented in FIG. 4B, where p is the amplitude loss factor.

An objective is that the signals obtained at the output of the circuit 400 must be regularly mutually phase shifted by a constant phase increment equal to a multiple of PI/8. The value of the phase increment depends on the input I1, . . . , I8 activated.

FIG. 4A represents an exemplary distributed feeding circuit with eight inputs and eight outputs according to the invention. The dual-input and dual-output couplers are used, as indicated for the example of FIG. 3, to decrease the number of hardware components required. Without departing from the scope of the invention, they can be replaced, as explained for the example of FIG. 2, by an assembly composed of an optical combiner and an optical divider connected in series.

The examples of FIGS. 1,2, 3, 4A, and 4B are given by way of illustration, for the proper understanding of the invention, but must not be interpreted as limiting the subject of the invention to these examples alone. In particular, the invention can be extended to any distributed feeding circuit comprising a number N of inputs and of outputs, N being a power of two, and whose transfer function is an orthogonal or unit matrix when the loss factor is equal to 1. In a first variant embodiment, the feeding circuit according to the invention is composed of a plurality of assemblies, such as described in FIG. 1, mutually interconnected directly or by way of delay lines of length equal to a multiple of the distance d'=ARF/(2N) where ARF is the wavelength of the signal at the microwave frequency. In a second variant embodiment, the assembly composed of an optical combiner and of an optical divider connected in series can be replaced with a dual-input and dual-output optical coupler as illustrated in FIGS. 3 and 4.

Figure 5A:
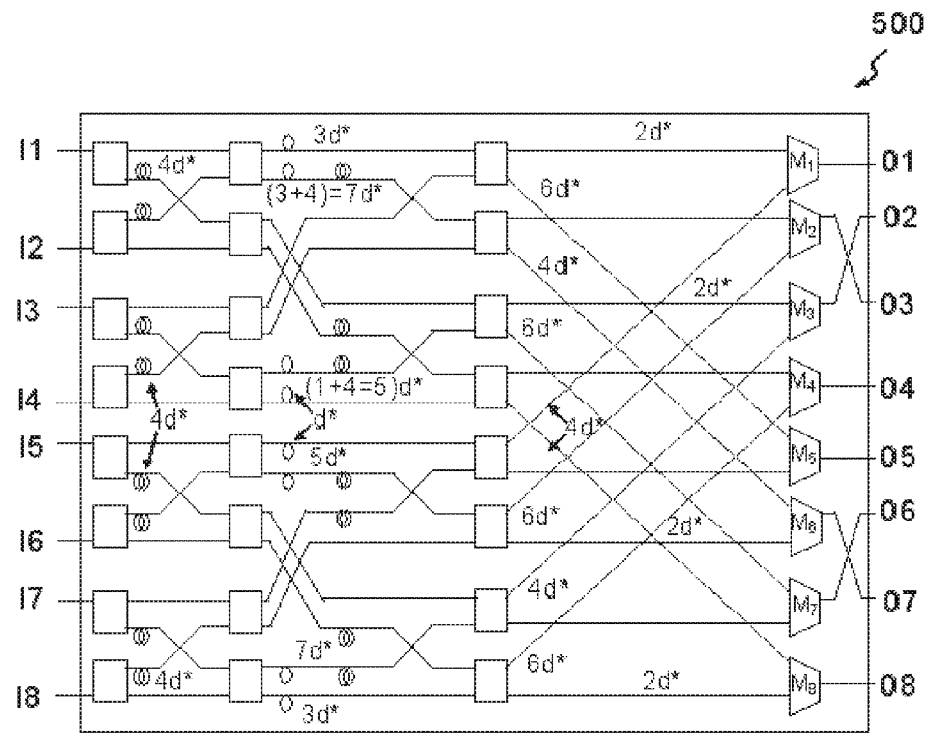

FIG. 5 represents another variant embodiment of the feeding circuit of FIG. 4.

The optical combiners forming the last stage of hardware components of the feeding circuit according to the invention may exhibit losses due to the fact that the signals that they receive at input are not phase-coherent. Stated otherwise, an optical combiner cannot perform a coherent recombination of two signals if they are not phase-coherent.

A means of solving this problem is to replace each optical combiner with a multiplexer of optical frequencies or more generally with a frequency-selective means making it possible to combine two signals on two different optical carriers. As an example, such a means can take the form of an optical interleaver or "wavelength interleaver", of a Mach-Zehnder interferometer or of any equivalent device able to multiplex several optical frequencies.

The signals produced on the various inputs I1, . . . I8 of the circuit 500 according to the invention are modulated on different optical carriers. Denoting by $\lambda 1$, . . . $\lambda 8$, the wavelengths associated with the optical carrier frequencies of each of the eight input signals of the circuit 500, it is possible to perform various associations between the optical carrier frequencies and the inputs of the circuit. By making the assumption that $\lambda 1 > \lambda 2 > \lambda 3 > \lambda 4 > \lambda 5 > \lambda 6 > \lambda 7 > \lambda 8$, a possible choice consists in assigning the optical carrier frequencies to the inputs I1, . . . I8 in increasing order of their value. The following table illustrates the assignment of the optical carriers to the various inputs:

| I1 | I2 | I3 | I4 | I5 | I6 | I7 | I8 |
|---|---|---|---|---|---|---|---|
| $\lambda 1$ | $\lambda 2$ | $\lambda 3$ | $\lambda 4$ | $\lambda 5$ | $\lambda 6$ | $\lambda 7$ | $\lambda 8$ |

By making this choice, the signals obtained on each output O1, . . . O8 of the circuit 500 will arise from the combination of a low optical frequency and of a high optical frequency.

Another possible choice consists in interleaving the optical carriers before assigning them to the various inputs I1, . . . I8 of the circuit 500. The following table illustrates the assignment of the optical carriers to the various inputs for this second choice:

| I1 | I2 | I3 | I4 | I5 | I6 | I7 | I8 |
|---|---|---|---|---|---|---|---|
| $\lambda 1$ | $\lambda 3$ | $\lambda 5$ | $\lambda 7$ | $\lambda 2$ | $\lambda 4$ | $\lambda 6$ | $\lambda 8$ |

By making this second choice, the signals obtained on each output O1, . . . O8 of the circuit 500 will arise from the combination of two adjacent optical frequencies.

Other choices are possible regarding the order of assignment of the optical wavelengths to the inputs of the circuit, but the two examples mentioned hereinabove exhibit the advantage of facilitating the embodiment of the multiplexers placed at the output of the feeding circuit.

Indeed it is observed on following the path of the signals in the example of FIG. 5 that for the first case of assignment of the optical carriers according to an increasing order of their values, each multiplexer receives on its upper input a signal carried by an optical wavelength $\lambda 1$ to $\lambda 4$, and on its lower input a signal carried by an optical wavelength $\lambda 5$ to $\lambda 8$. The eight multiplexers M1, . . . M2 can therefore be identical multiplexers of two adjacent sub-bands, also dubbed 'diplexers'.

For the second case of assignment of the optical carriers according to a prior interleaving, the eight multiplexers M1, . . . M2 can be multiplexers with periodic transfer function, known by the term "wavelengths interleaver". Such a device can be embodied in the guise of discrete hardware component or be implanted on the same PIC optical circuit as the circuit according to the invention.

Figure 5B:
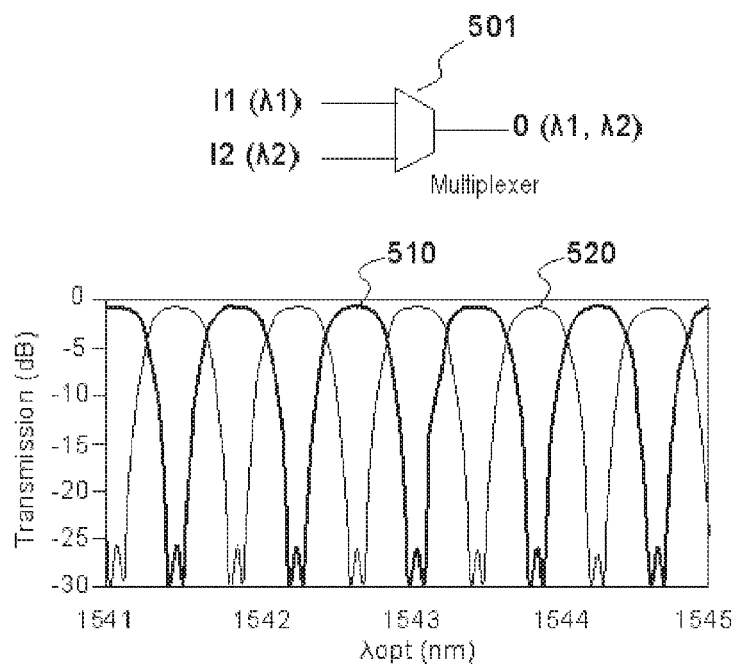

FIG. 5bis illustrates the operating principle of a wavelengths-interleaving multiplexer 501. On the right of FIG. 5bis is represented a diagram of the spectrum at the output of the eight multiplexers M1, . . . M8. This spectrum comprises two sets of interleaved optical carriers 510,520. The first set 510 corresponds to the odd wavelengths and the second set 520 corresponds to the even wavelengths.

The exemplary embodiments of the invention described hereinabove in support of FIGS. 1 to 5 are all based on a feeding circuit according to the invention with two inputs and two outputs, one output of which is phase-shifted with respect to the other output by +/−90° and whose transfer function is given by the matrix $$T = \frac{1}{p\sqrt{2}} \begin{pmatrix} 1 & -j \\ -j & 1 \end{pmatrix}$$

and an exemplary implementation is given in FIG. 1. By convention, such a circuit is named a 90° coupler.

Without departing from the scope of the invention, the 90° coupler of FIG. 1 can be replaced with any other device carrying out the function of a coupler and whose transfer function is orthogonal or unitary (when the combiners used are loss-free).

For example, another possible basic device is a 180° hybrid coupler whose transfer function is given by the matrix $$T' = \frac{1}{p\sqrt{2}} \begin{pmatrix} 1 & 1 \\ -1 & 1 \end{pmatrix}$$

and which provides as output two equi-amplitude signals which are either in phase, or in phase opposition (that is to say phase-shifted by 180°) instead of a phase shift of −/+90° as for the device of FIG. 1.

Such a device can be embodied in the same manner as that presented in FIG. 1 except for the difference that the two delay lines LR1,LR2 have a different length. The first delay line LR1 has a length equal to half the wavelength of the signal at the microwave frequency. The second delay line LR2 has a zero length, stated otherwise this second delay line can be dispensed with.

On the basis of this variant of the basic device according to the invention with two inputs and two outputs, it is possible to construct, as indicated in FIGS. 2 to 5, distributed feeding circuits according to the invention having an even number greater than two of inputs and of outputs.

The only modifications to be afforded to the circuits described in FIGS. 2 to 5 are the lengths of the delay lines which are configured so that the transfer function of the distributed feeding circuit obtained is given by the matrices presented in FIG. 5ter.

The matrix $T'_4$ is the theoretical transfer function of a feeding circuit according to the invention with 4 inputs and 4 outputs composed of 4 basic hybrid couplers whose theoretical transfer functions are equal to $T'$.

The diagram of a distributed feeding circuit of theoretical transfer function equal to $T'_4$ is identical to the diagram of FIG. 2 except for the differences that the four assemblies 201,202,203,204 consist of 180° hybrid couplers according to the second variant of the invention, one of the two additional delay lines LR5,LR6 is of length equal to a quarter of the wavelength of the signal at the microwave frequency (stated otherwise to half the length of a delay line of the basic 180° hybrid coupler) and the other additional delay line LR5,LR6 is of zero length.

It is therefore seen that the design, according to the invention, of a circuit with 4 inputs and 4 outputs on the basis of a 180° hybrid coupler is effected in a manner equivalent to that of the circuit of FIG. 2 obtained on the basis of a 90° coupler.

Likewise it is also possible to design a distributed feeding circuit with eight inputs and eight outputs whose theoretical transfer function is the matrix $T'_8$ and which is designed on the basis of several 180° hybrid couplers on the same principle as that described in FIGS. 4 and 5.

By observing the matrix $T'_8$, it is noted that, for each column, a phase gradient makes it possible to pass from one line to the other:

−2π/8, 6π/8, −6π/8, 2π/8, −4π/8, 4π/8, −8π/8, 1

The values of the phase shifts obtained at the output of the 8×8 circuit are therefore even multiples of π/8 and a sign alternation is present between two adjacent outputs.

Figure 6:
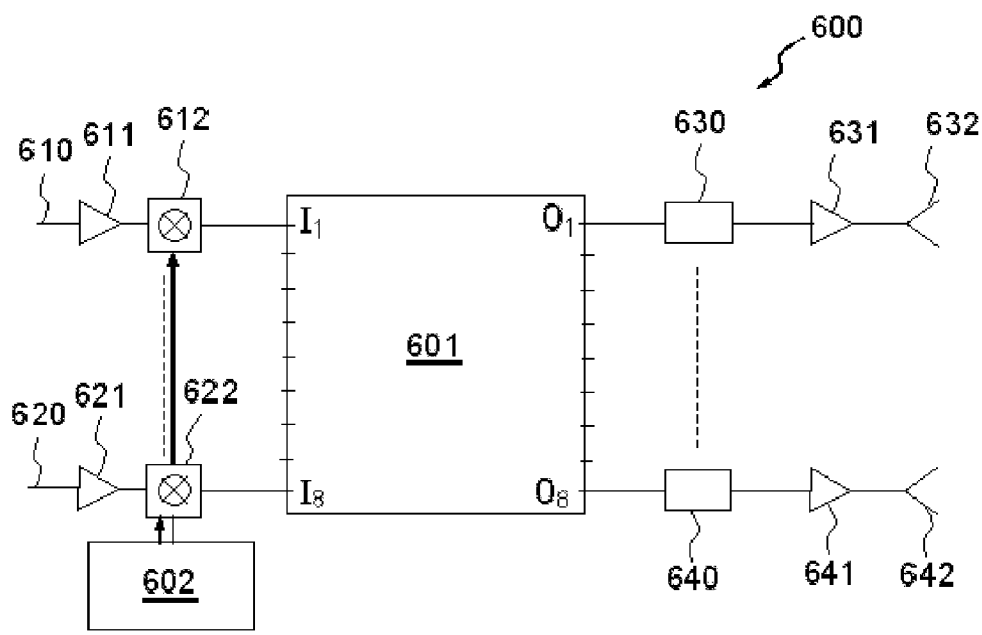

FIG. 6 represents a diagram of an antenna beamforming array 600 comprising a distributed feeding circuit 601 according to the invention.

By way of illustration, the antenna beamforming array 600 described in FIG. 6 is adapted for feeding eight antennal elements 632,642 and comprises a distributed feeding circuit 601 according to the invention with eight inputs and eight outputs.

Each input I1, . . . I8 is connected to an optical modulator 612,622, for example a Mach-Zehnder modulator, which receives on an input an electrical or microwave-frequency signal 610,620 previously optionally amplified by way of an amplifier 611,621. The second input of each optical modulator 612,622 is connected to a generator of optical carriers 602 which is able to generate at least one optical carrier of wavelength λ1. Advantageously, the generator 602 is able to generate as many optical carriers as inputs of the distributed feeding circuit 601. For example, the generator 602 may be able to implement a wavelength multiplexing technique, or "wavelength division multiplexing", so as to generate, in the example of FIG. 6, eight carriers at eight wavelengths λ1 . . . λ8. Each optical carrier thus modulates the microwave-frequency signal produced on one of the inputs of the circuit 601.

The signal obtained on each of the outputs O1, . . . O8 of the circuit 601 is thereafter demodulated by way of an optical detector 630,640, for example a photo-detector, able to convert the optical signal into an electrical signal which is thereafter optionally amplified by way of amplifiers 631,641 before being conveyed to the radiating elements 632,642 of the antenna array to be fed.

Figure 7:
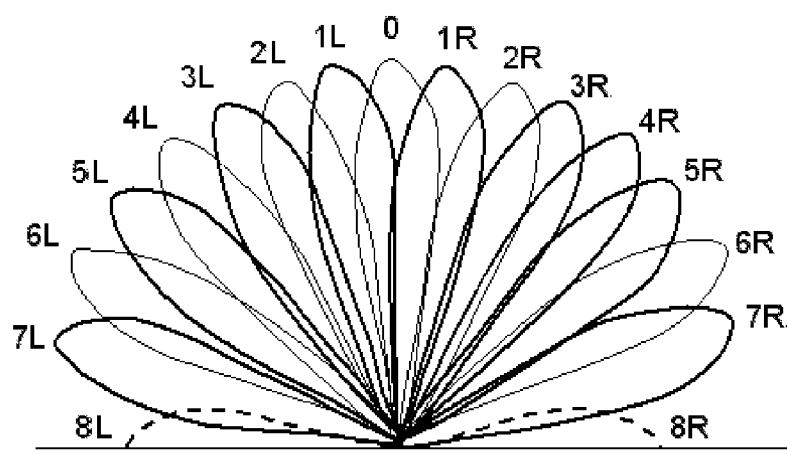

FIG. 7 illustrates the antenna radiation diagram obtained for an antenna beamforming array of the type of that of FIG. 6.

In FIG. 7, two diagrams are represented, the first, in solid line, corresponds to the use of a 90° basic coupler described in FIG. 1, the second, in dashed line, corresponds to the use of a 180° basic coupler as explained in the description hereinabove.

Alongside each beam generated, the digit (ranging from 0 to 8) indicates the multiplier coefficient of π/8 corresponding to the phase shift between two adjacent outputs of the device. The letter (L or R) gives the orientation (left or right) of the beam.

It is seen that the two basic coupler variants according to the invention make it possible to design two complementary beamforming arrays.

Figure 8:
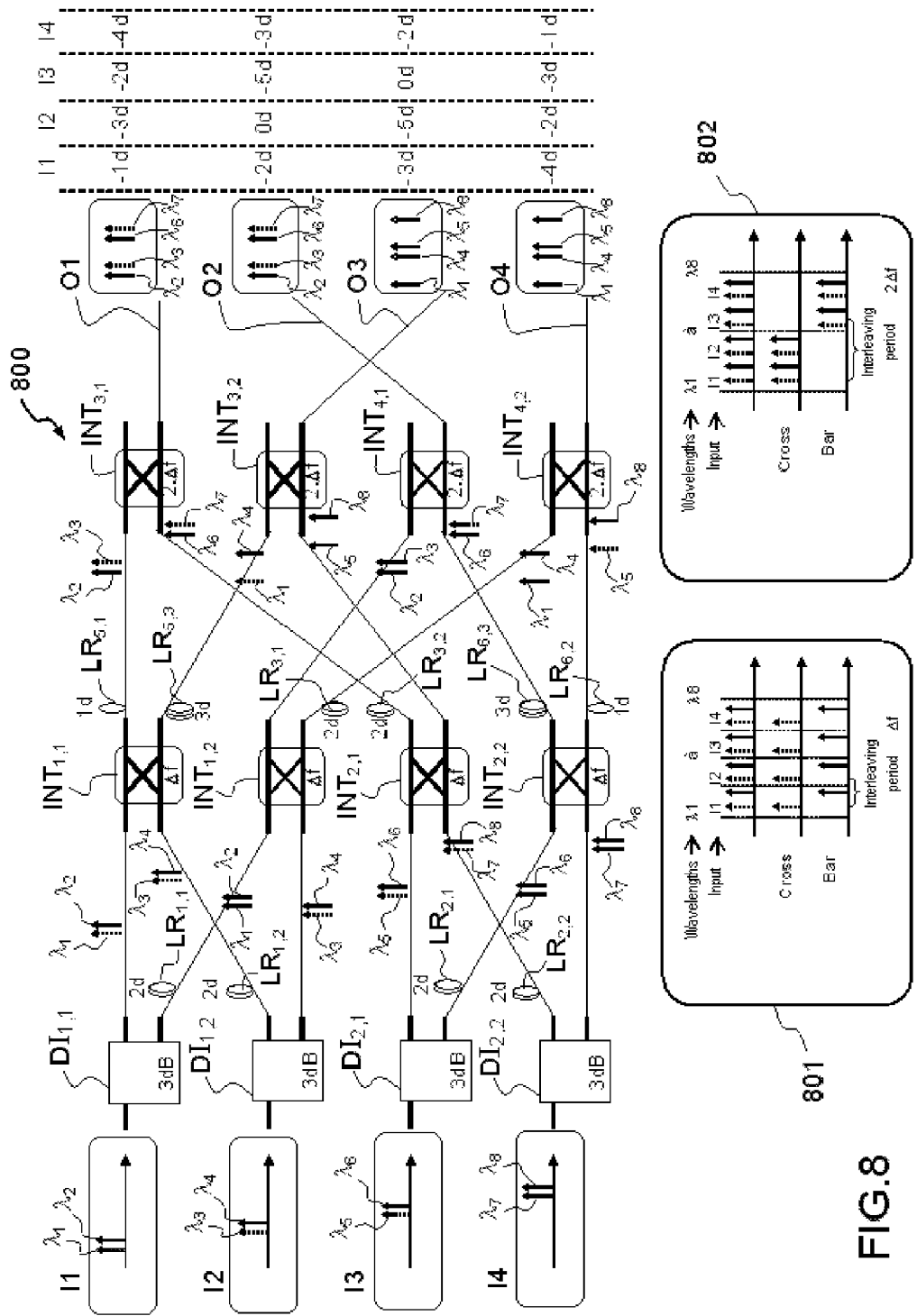

FIG. 8 shows schematically another variant embodiment of the distributed feeding circuit according to the invention with four inputs and four outputs and previously described in support of FIG. 3.

The common elements of the circuits described in FIGS. 3 and 8 bear the same references.

In this new variant, the optical couplers $CP_{1,1}$, $CP_{1,2}$, $CP_{2,1}$, $CP_{2,2}$ are replaced with a first series of optical interleavers $INT_{1,1}$, $INT_{1,2}$, $INT_{2,1}$, $INT_{2,2}$, and the optical combiners $CO_{3,1}$, $CO_{3,2}$, $CO_{4,1}$, $CO_{4,2}$ are replaced with a second series of optical interleavers $INT_{3,1}$, $INT_{3,2}$, $INT_{4,1}$, $INT_{4,2}$. The optical interleavers are hardware components with four ports, two input ports and two output ports. Their manner of operation is illustrated by the diagrams 801 and 802.

For an assembly of eight regularly spaced optical wavelengths $\lambda_1$, . . . $\lambda_8$, an optical interleaver $INT_{1,1}$ of the first series is configured to route one wavelength out of two towards the first output port and the other wavelength towards the second output port. This principle is illustrated in the diagram 801, the wavelengths $\lambda_1$, $\lambda_3$, $\lambda_5$, $\lambda_7$, represented dashed are routed towards the output port opposite the input port on which the signal is injected. On the contrary the wavelengths $\lambda_2$, $\lambda_4$, $\lambda_6$, $\lambda_8$, represented solid are routed towards the direct output port with respect to the input port on which the signal is injected.

The optical interleavers of the second series operate on the same principle as those of the first series except for the difference that the interleaving period is double that of the first series. The manner of operation is illustrated by the diagram 802. The first four optical wavelengths $\lambda_1$, $\lambda_2$, $\lambda_3$, $\lambda_4$, are conveyed to the opposite output port and the following four optical wavelengths $\lambda_5$, $\lambda_6$, $\lambda_7$, $\lambda_8$ are conveyed to the direct output port.

The use of optical interleavers in place of couplers or combiners makes it possible to avoid the possible losses on recombining the signals at output.

The overall manner of operation of the distributed feeding circuit 800 according to the invention is described in FIG. 8. On each input I1,I2,I3,I4, of the circuit 800, an electrical signal modulating two different optical wavelengths is produced. The conveying of the optical wavelengths to the outputs of the circuit 800 is illustrated in FIG. 8. The first two outputs O1,O2, can receive the wavelengths $\lambda_2$, $\lambda_3$, $\lambda_6$, $\lambda_7$. The last two outputs O3,O4 can receive the wavelengths $\lambda_1$, $\lambda_4$, $\lambda_5$, $\lambda_8$.

The circuit, described in FIG. 8, according to the invention can be generalized, without departing from the scope of the invention, to any circuit with N inputs and N outputs, with N a power of two.

Figure 9:
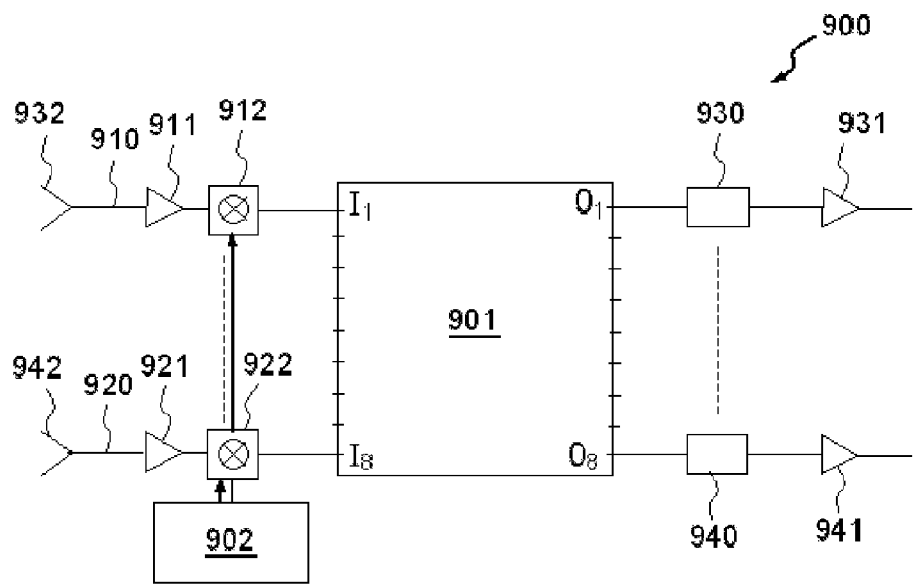

FIG. 9 represents a diagram of an antenna device 900 operating in reception.

Such a device 900 comprises a distributed feeding circuit 901 according to the invention and operates according to a similar principle to that described in FIG. 6 except that the device of FIG. 6 relates to an antenna system operating in transmission.

The distributed feeding circuit 901 is identical to the distributed feeding circuit 601 used for the beamforming array described in FIG. 6 except for the difference that it undergoes a mirror symmetry with respect to the arrangement of the circuit 601 of FIG. 6. Stated otherwise, its inputs I1, . . . I8 and its outputs O1, . . . O8 are inverted.

Indeed in the circuit 601 used for the transmitter device of FIG. 6, the linear phase laws are obtained on the outputs Oi by feeding the inputs Ij; but the inverse is not true. For an antenna in reception, such as described in FIG. 9, the linear phase laws must be sited on the side of the radiating elements, that is to say on the side of the inputs Ij. The circuit 901 obtained by mirror symmetry on the basis of the circuit 601 of FIG. 6 fulfils this function, since all the couplers of which it is composed are reciprocal devices. It is fed through the ports Ij using linear phase laws (generated starting from the axes of the 8 nominal beams of the antenna) and the energy converges respectively towards one of the 8 outputs. The arrangement of the circuit 901 corresponds to the use of the circuit 601 of FIG. 6 in reverse, in which the signals would propagate from right to left.

Each input I1, . . . I8 is connected to an optical modulator 912,922, for example a Mach-Zehnder modulator, which receives on an input an electrical or microwave-frequency signal 610,620 received by way of an antenna element 932,942 and previously optionally amplified by way of an amplifier 911,921. The second input of each optical modulator 912,922 is connected to a generator of optical carriers 902 which is able to generate at least one optical carrier of wavelength $\lambda 1$.

The signal obtained on each of the outputs O1, . . . O8 of the circuit 901 is thereafter demodulated by way of an optical detector 930,940 for example a photo-detector, able to convert the optical signal into an electrical signal which is thereafter optionally amplified by way of amplifiers 931,941.

Figure 10:
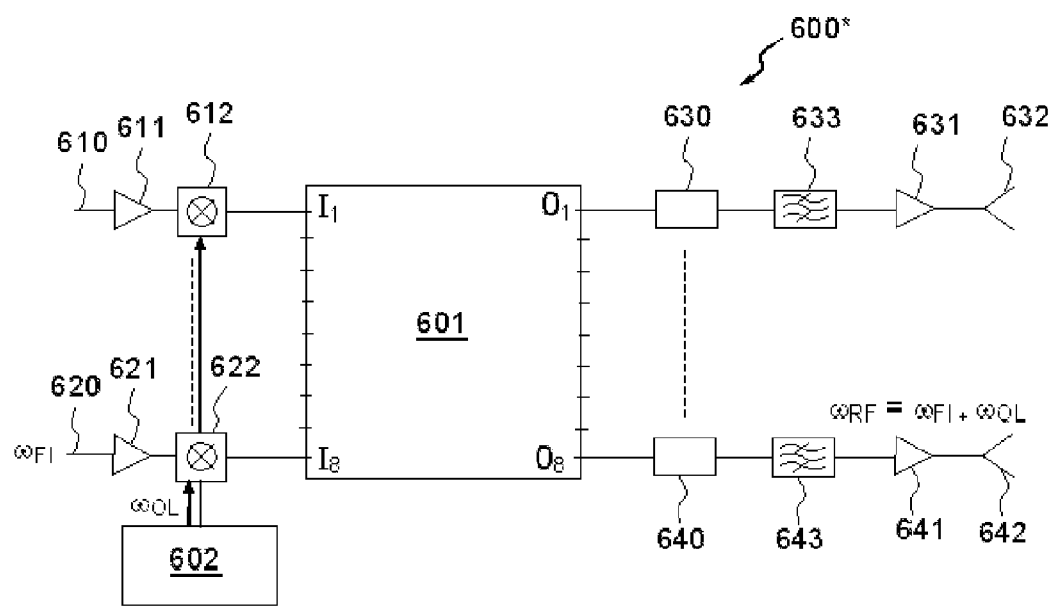

FIG. 10 shows schematically a variant of the beamforming array according to the invention and described in FIG. 6.

The device 600* represented in FIG. 10 is identical to that represented in FIG. 6 except for the following differences.

Each optical modulator 612,622 is no longer fed by continuous optical carriers, but by optical carriers which are themselves modulated by a frequency, or angular frequency, $\omega_{OL}$ of a microwave local oscillator and generated by the generator 602. The optical modulators 612,622 then play the role of optoelectronic mixers by receiving, on a first input, an electrical or microwave-frequency signal 610,620 at an intermediate frequency, or angular frequency, $\omega_{FI}$ and on a second input the optoelectronic signal generated by the generator 602. The principle of implementation of a function of optoelectronic mixing by an optical modulator is known per se, for example described in the publication "G. K. Gopalakakrishnan et al., A LiNbO$_3$ microwave-optoelectronic mixer with linear performance, *IEEE MTT-S Dig*, 1993, pp. 1055-1058".

The device 600* of FIG. 10 furthermore comprises, for each output pathway, a filter 633,643 of the bandpass filter type, making it possible to extract the frequency component $\omega_{RF}=\omega_{FI}+\omega_{OL}$ of the output signal of the feeding circuit 601.

Figure 11:
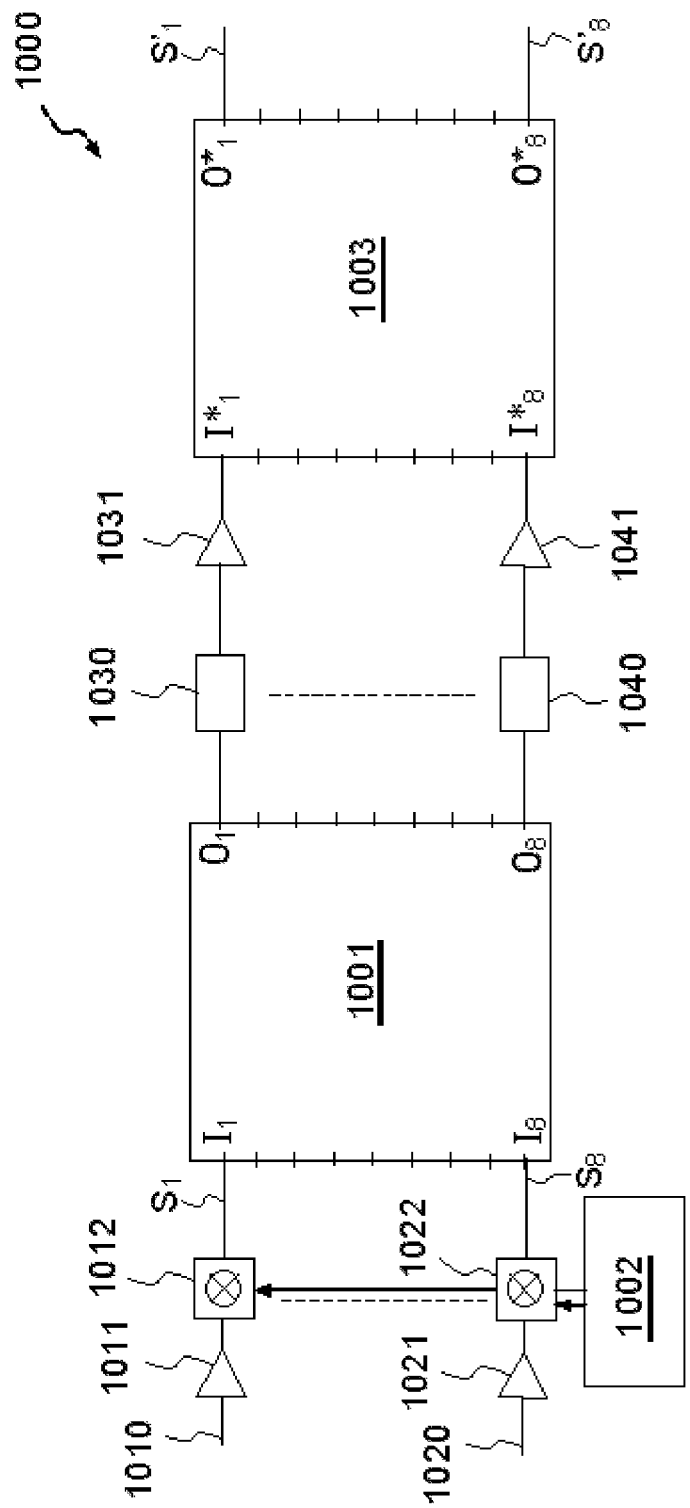

FIG. 11 represents a diagram of a multi-port amplification device comprising two distributed feeding circuits according to the invention.

It is known that a distributed feeding circuit, of the Butler matrix type, can serve to feed, not an antenna array, but an assembly of power amplifiers, so as to average the instantaneous power which passes through them.

A multi-port amplification device 1000 such as this can be designed by using a distributed feeding circuit 1001 according to the invention, as shown schematically in FIG. 11.

The multi-port amplification device 1000 comprises a first distributed feeding circuit 1001 according to the invention comprising eight inputs and eight outputs (it being understood that this number can be broadened to other values, as already explained in the description).

Each input I1, . . . I8 is connected to an optical modulator 1012,1022, for example a Mach-Zehnder modulator, which receives on an input an electrical or microwave-frequency signal 1010,1020 previously optionally amplified by way of an amplifier 1011,1021. The second input of each optical modulator 1012,1022 is connected to a generator of optical carriers 1002 which is able to generate at least one optical carrier of wavelength $\lambda 1$. Advantageously, the generator 1002 is able to generate as many optical carriers as inputs of the distributed feeding circuit 1001. For example, the generator 1002 may be able to implement a wavelength multiplexing technique, or "wavelength division multiplexing", so as to generate, in the example of FIG. 11, eight carriers at eight wavelengths $\lambda 1$, . . . $\lambda 8$. Each optical carrier thus modulates the microwave-frequency signal produced on one of the inputs of the circuit 1001.

The signal obtained on each of the outputs O1, . . . O8 of the circuit 1001 is thereafter demodulated by way of an optical detector 1030,1040, for example a photo-detector, able to convert the optical signal into an electrical signal which is thereafter optionally amplified by way of amplifiers 1031,1041 before being conveyed to the inputs I*1, . . . I*8 of a second distributed feeding circuit 1003 whose transfer function is the inverse $M^{-1}$ of that, M, of the first circuit 1001.

The phase laws generated at the output of the first circuit 1001 are not necessarily 'equidistant linear', but only mutually orthogonal.

The theoretical total gain in power of the amplification device 1000, measured between an input S1,S8 and a corresponding output S'1,S'8, is equal to the gain afforded by the subassembly composed of an optical detector 1030,1040 concatenated with an amplifier 1031,1041.

This gain is to be weighted by the possible losses arising in the first and second circuits 1001,1003 as well as those originating from any imperfection of production leading as a consequence to the fact that the transfer functions M and $M^{-1}$ of the first and second circuits 1001,1003 are not perfectly inverse.

Other uses of a distributed feeding circuit according to the invention are possible. In particular, several circuits can be arranged in cascade so as to produce a beam-former adapted for feeding a two-dimensional antenna array, for example a planar or conformal array.

The invention claimed is:

1. A distributed feeding circuit for antenna beamforming array comprising a plurality N of inputs and a plurality N of outputs, wherein the distributed feeding circuit is adapted for receiving, on at least one input, a microwave-modulated optical signal, modulated on at least one optical carrier, the distributed feeding circuit comprising at least one assembly of at least two optical dividers, at least one delay line of length substantially equal to an integer fraction of a wavelength of the signal at its microwave frequency and two optical combiners for combining two optical signals, the assembly being arranged and the delay lines being configured so that a theoretical transfer function of the circuit is an orthogonal matrix.

2. The distributed feeding circuit of claim 1, wherein a delay line is connected, at a first end, to a first output of an optical divider.

3. The distributed feeding circuit of claim 1, wherein an optical divider is connected, by its input, to an input of the circuit.

4. The distributed feeding circuit of claim 1, wherein an optical combiner for combining two optical signals is connected, by its output, to an output of the circuit.

5. The distributed feeding circuit of claim 4, wherein the assembly comprises a delay line of length substantially equal to half the wavelength of the signal at its microwave frequency.

6. The distributed feeding circuit of claim 1, wherein the assembly comprises two delay lines which are of length substantially equal to a quarter of the wavelength of the signal at its microwave frequency.

7. The distributed feeding circuit of claim 1, wherein the number N of inputs and of outputs is a power of two.

8. The distributed feeding circuit of claim 7, wherein a second output of an optical divider is connected to a first input of an optical combiner for combining two optical signals and a delay line is connected, at a second end, to a second input of an optical combiner for combining two optical signals.

9. The distributed feeding circuit of claim 8, wherein the distributed feeding circuit comprises a number of assemblies which is equal to a binary logarithm of the number N of inputs and of outputs that is multiplied by half of the number N.

10. The distributed feeding circuit of claim 9, wherein an output of an optical combiner for combining two optical signals of a first assembly is connected to an input of an optical divider of a second assembly, directly or by way of an additional delay line of length zero or substantially equal to half the length of a delay line, of non-zero length, of one of the assemblies, the length being configured so that the theoretical transfer function of the distributed feeding circuit is an orthogonal matrix.

11. The distributed feeding circuit of claim 10, wherein the assembly formed by an optical combiner for combining two optical signals and an optical divider, connected in series, is replaced with an optical coupler, the additional delay line being connected, at a first end, to an output of an optical coupler.

12. The distributed feeding circuit of claim 11, wherein an optical coupler is replaced with a first interleaver of optical wavelengths and an optical combiner, linked to an output of the circuit, for combining two optical signals, is implemented with a second interleaver of optical wavelengths, an interleaver of optical wavelengths being able to receive on an input a plurality of optical wavelengths and to deliver them alternatively on one or the other of its outputs according to a given interleaving period, an interleaving period of a second interleaver being equal to double the interleaving period of a first interleaver.

13. The distributed feeding circuit of claim 1, wherein an optical combiner for combining two optical signals is implemented with a 3-dB optical combiner.

14. The distributed feeding circuit of claim 1, wherein an optical combiner for combining two optical signals is implemented with a multiplexer of at least two optical wavelengths and the theoretical transfer function of the distributed feeding circuit is a unitary matrix.

15. The distributed feeding circuit of claim 1, wherein the distributed feeding circuit is an optical integrated circuit or a circuit implemented with optical fibres.

16. An antenna beamforming array comprising a modulator for producing at least one microwave-modulated optical signal, a distributed feeding circuit for antenna beamforming array comprising a plurality N of inputs and a plurality N of outputs, wherein the distributed feeding circuit is adapted for receiving, on at least one input, a microwave-modulated optical signal, modulated on at least one optical carrier, the distributed feeding circuit comprising at least one assembly of at least two optical dividers, at least one delay line of length substantially equal to an integer fraction of a wavelength of the signal at its microwave frequency and two optical combiners for combining two optical signals, the assembly being arranged and the delay lines being configured so that a theoretical transfer function of the circuit is an orthogonal matrix, said distributed feeding circuit being for receiving the at least one microwave-modulated optical signal, the antenna beamforming array also comprising a convertor for converting the microwave-modulated optical signal into an electrical signal to feed at least one antennal element of an antenna array.

17. The antenna beamforming array of claim 16, wherein the modulator is adapted for modulating electrical signals to be injected onto the inputs of the distributed feeding circuit on optical carriers of different wavelengths.

18. A method for using an antenna beamforming array comprising a modulator for producing at least one microwave-modulated optical signal, a distributed feeding circuit for antenna beamforming array comprising a plurality N of inputs and a plurality N of outputs, wherein the distributed feeding circuit is adapted for receiving, on at least one input, a microwave-modulated optical signal, modulated on at least one optical carrier, the distributed feeding circuit comprising at least one assembly of at least two optical dividers, at least one delay line of length substantially equal to an integer fraction of a wavelength of the signal at its microwave frequency and two optical combiners for combining two optical signals, the assembly being arranged and the delay lines being configured so that a theoretical transfer function of the circuit is an orthogonal matrix, said distributed feeding circuit being for receiving the microwave-modulated optical signal and the antenna beamforming array also comprising a convertor for converting the microwave-modulated optical signal into an electrical signal to feed at least one antennal element of an antenna array, said method comprising injecting, onto the inputs of the distributed feeding circuit, a plurality of the microwave-modulated optical signals according to an increasing arrangement of values of optical wavelengths of the signals or according to an arrangement alternating even and odd values of the optical wavelengths of the signals.

19. A receiver comprising a plurality of antennal elements delivering an electrical signal, a modulator for producing a microwave-modulated optical signal, a distributed feeding circuit for antenna beamforming array comprising a plurality N of inputs and a plurality N of outputs, wherein the distributed feeding circuit is adapted for receiving, on at least one input, a microwave-modulated optical signal, modulated on at least one optical carrier, the distributed feeding circuit comprising at least one assembly of at least two optical dividers, at least one delay line of length substantially equal to an integer fraction of a wavelength of the signal at its microwave frequency and two optical combiners for combining two optical signals, the assembly being arranged and the delay lines being configured so that a theoretical transfer function of the circuit is an orthogonal matrix, said distributed feeding circuit being for receiving the microwave-modulated optical signal and the receiver also comprising a convertor for converting the microwave-modulated optical signal into an electrical signal.

20. A multi-port amplification device comprising a modulator for producing at least one microwave-modulated optical signal, a first distributed feeding circuit for antenna beamforming array comprising a plurality N of inputs and a plurality N of outputs, wherein the distributed feeding circuit is adapted for receiving, on at least one input, a microwave-modulated optical signal, modulated on at least one optical carrier, the distributed feeding circuit comprising at least one assembly of at least two optical dividers, at least one delay line of length substantially equal to an integer fraction of a wavelength of the signal at its microwave frequency and two optical combiners for combining two optical signals, the assembly being arranged and the delay lines being configured so that a theoretical transfer function of the circuit is an orthogonal matrix, said distributed feeding circuit being for receiving the microwave-modulated optical signal, the multi-port amplification device also comprising a convertor for converting the microwave-modulated optical signal into an electrical signal and a second distributed feeding circuit designed to receive an electrical output signal from the convertor.

21. A method for using a distributed feeding circuit for antenna beamforming array comprising a plurality N of inputs and a plurality N of outputs, wherein the distributed feeding circuit is adapted for receiving, on at least one input, a microwave-modulated optical signal, modulated on at least one optical carrier, the distributed feeding circuit comprising at least one assembly of at least two optical dividers, at least one delay line of length substantially equal to an integer fraction of a wavelength of the signal at its microwave frequency and two optical combiners for combining two optical signals, the assembly being arranged and the delay lines being configured so that a theoretical transfer function of the circuit is an orthogonal matrix, said method comprising injecting, onto the inputs of the distributed feeding circuit, a plurality of microwave-modulated optical signals according to an increasing arrangement of values of optical wavelengths of the signals or according to an arrangement alternating even and odd values of the optical wavelengths of the signals.

* * * * *